United States Patent [19]
Vejdani et al.

[11] Patent Number: 5,566,608
[45] Date of Patent: Oct. 22, 1996

[54] VERTICAL FLOW RIPENING ROOM

[75] Inventors: Mehrdad Vejdani, Prembroke Pines; Zbigniew Kilarski, Miami, both of Fla.

[73] Assignee: Cool Care Consulting, Inc., Deerfield Beach, Fla.

[21] Appl. No.: 427,310

[22] Filed: Apr. 24, 1995

Related U.S. Application Data

[63] Continuation of Ser. No. 326,900, Oct. 21, 1994, abandoned.

[51] Int. Cl.$^6$ .............................. A23B 7/00; A23B 7/144; A23L 1/00; A23L 3/00
[52] U.S. Cl. ................................ 99/475; 99/467; 99/473; 99/476
[58] Field of Search ............................ 99/467, 472–476; 426/419; 34/192, 194, 196, 197; 62/329; 165/61; 312/116, 236; 454/118, 174

[56] References Cited

U.S. PATENT DOCUMENTS

| | | |
|---|---|---|
| 1,262,860 | 4/1918 | Smith . |
| 1,410,719 | 3/1922 | Rea . |
| 1,736,788 | 9/1929 | Huston . |
| 1,939,957 | 12/1933 | Day . |
| 2,079,304 | 5/1937 | Polderman . |
| 2,279,847 | 4/1942 | Stebbins . |
| 3,008,838 | 11/1961 | Brunsing et al. . |
| 3,123,988 | 3/1964 | Richman . |
| 3,184,862 | 5/1965 | Frank . |
| 3,389,946 | 6/1968 | Nicolaus et al. . |
| 3,638,450 | 2/1972 | Falk . |
| 3,982,584 | 9/1976 | Spanoudis . |
| 4,354,549 | 10/1982 | Smith . |
| 4,426,923 | 1/1984 | Ohata . |
| 4,566,377 | 1/1986 | van Buytene . |
| 4,676,152 | 6/1987 | Tsuji et al. . |
| 4,824,685 | 4/1989 | Bianco . |
| 5,041,298 | 8/1991 | Wallace et al. . |
| 5,203,256 | 4/1993 | Mueller ................................. 99/475 |
| 5,373,780 | 12/1994 | Bianco . |
| 5,419,153 | 5/1995 | Hartley . |
| 5,438,917 | 8/1995 | Bolkestein et al. ........................ 99/476 |
| 5,497,698 | 3/1996 | Bolkestein ................................ 99/476 |

FOREIGN PATENT DOCUMENTS

| | | |
|---|---|---|
| 2651645 | 3/1991 | France . |

OTHER PUBLICATIONS

F. G. Mitchell, Rene Guillou, R. A. Parson, "Commercial Cooling Of Fruits And Vegetables," Division of Agricultural Sciences, University of California, 1972.

Primary Examiner—Timothy F. Simone
Attorney, Agent, or Firm—Kenyon & Kenyon

[57] ABSTRACT

The disclosure is related to a method and apparatus for controlling the ripening of fresh produce, particularly the ripening of fresh fruit such as bananas. The fresh produce is arranged into a palletized load which is inserted into a ripening chamber. The palletized load is arranged into at least two spaced rows, each of said rows including at least two vertically spaced tiers to maximize the total amount of produce to be processed for the given floor space of the ripening chamber. A low pressure plenum is formed in the interstitial space between the at least two rows of palletized produce by sealing the space between the rows and the vertical space between the at least two tiers. A controlled fluid flow is introduced around the palletized produce load. Fluid is exhausted from above the interstitial space to create a low pressure plenum. This in turn creates a pressure differential across the produce load such that the introduced fluid is forced to flow from the space around the produce load, uniformly through the produce load, and into the low pressure plenum. The uniform fluid flow is utilized to control the ripening of the inserted produce load. Exhausting the fluid from above the interstitial space allows a far larger amount of produce to be ripened than in earlier systems because the system may be readily expanded to accommodate any size room.

20 Claims, 4 Drawing Sheets

VERTICAL FLOW RIPENING ROOM

This application is a continuation of application Ser. No. 08/326,900 filed on 21 Oct. 1994, now abandoned.

BACKGROUND OF THE INVENTION

The invention is directed to a method and apparatus for controlling the ripening of fresh produce, particularly fresh fruit such as bananas.

Bananas and other fresh produce are typically transported from the growing fields to a processing facility where they are placed in specially designed ripening rooms. Such ripening rooms are provided with insulated, gas-tight wall and roof panels and include an air handling unit to control the circulation and temperature of the air within the ripening room. In this manner, the ripening of the fresh produce may be controlled in accordance with a predetermined ripening schedule such that the fruit is properly ripened at the time it is scheduled for delivery to retail outlets. To assist in this, ethylene gas is dispersed into the room at a preselected time to facilitate a uniform ripening of the produce. Accordingly, the use of ripening rooms enables the delivery of high quality produce to retail outlets without the constraint of having to schedule delivery in accordance with the natural ripening process of the fruit and further obviates problems associated with accelerations and decelerations of the ripening process due to changing conditions during the transportation of the produce.

In a prior ripening room arrangement, the produce was packed into unitized shipping modules comprising individual protective boxes which were block-stacked on pallets. The palletized produce was inserted into a ripening chamber having a floor, a ceiling and front, rear and side walls, which was of suitable dimensions to enclose two spaced rows of the palletized produce. The two rows were spaced apart from one another within the chamber to define an interstitial space between the rows which substantially forms a low pressure plenum. There is also provided sufficient spacing between the palletized produce and the ceiling and walls of the chamber to define a high pressure air space around and above the inserted produce load.

A tarp arrangement was placed over the top and one end of the spacing between the two rows of palletized produce to seal off the low pressure plenum from the high pressure air space. Exhaust fans were arranged in a sealed relation at the opposite end of the spacing between the rows to withdraw air from the spacing and thereby create a pressure differential between the tarp sealed plenum and the high pressure air space. Air introduced by an air handling unit is forced by the pressure differential between the high pressure air space and the low pressure plenum to flow through openings formed in the sides of the boxes, around the produce contained therein and into the low pressure plenum to be exhausted by the fans. In this manner, a forced air circulation is caused to flow uniformly throughout the produce load in the chamber to thereby uniformly control the temperature of the produce with a minimal temperature differential throughout the produce load. The temperature and flow rate of the air introduced into the chamber by the air handling unit may be accurately controlled to achieve a desired ripening rate for the produce.

A deficiency of this system, however, is that the placement of the intake and exhaust fans, at one end of the room, creates a definite length limit to the room. That is, the air handling unit may only accommodate a predetermined number of pallets of produce. While the use could conceivably lengthen the room, the ability of the air handling unit to effectively remove the air from a larger room, and at a farther distance away, would be severely compromised.

There is a need for a ripening system which may be easily expanded to allow the ripening of even larger amounts of produce. There is further a need for a ripening system which dispenses with the complicated tarp arrangement.

SUMMARY OF THE INVENTION

These needs and others are met by the ripening room of the present invention. It is a primary objective of the present invention to provide an improved pressurized ripening system of the above-described type by substantially increasing the amount of usable floor space without any sacrifice in the control and accuracy of the preselected produce temperature. More specifically, the ripening system of the invention generally comprises a cooling chamber having a floor and ceiling and front, rear and side walls and being of suitable dimensions to enclose at least two rows of at least two tiers of unitized and palletized produce. As in the previous system, the rows are spaced apart from one another to define an interstitial volume between the rows which substantially forms a low pressure plenum. There is also sufficient spacing between the chamber ceiling and walls and the inserted palletized produce to define an interstitial volume which forms a high pressure, air plenum.

Pursuant to an important feature of the invention, a frame structure is arranged within the chamber to provide a guide means to position the palletized produce upon insertion into the chamber into the at least two spaced, plenum-forming rows and to support at least a second, and preferably a third and/or fourth tier of palletized produce directly above the first tier of palletized produce. The support function of the frame structure prevents damage to the protective boxes of the palletized produce of the first, lower tier. Such protective boxes are typically used to unitize and protect the palletized produce. The frame structure is also arranged and configured relative to the side walls of the chamber to position the inserted upper tiers of palletized produce at positions which are spaced inwardly from each of the side walls of the chamber for forced air circulation from the high pressure air plenum, through the unitized, palletized produce and into the low pressure plenum, as will appear.

The chamber is provided with a fluid control means such as an overhead air handling unit to provide a controlled air flow into the high pressure air plenum as well as to exhaust the air from the interstitial spaces, thereby creating the low pressure plenum. In this manner, a pressure differential is created between the high pressure air plenum and the low pressure plenum to provide a fluid circulation space within the chamber.

In accordance with another significant feature of the invention, a flexible ceiling is conformed to the top of the palletized produce. Seals are also provided and will be discussed later to seal the volumes within the pallets and between the tiers from air flow as well as to seal the top and front of the interstitial space from air flow. The arrangement of the block-stacked produce is flush with the rear of the chamber such that negligible air flow is achieved through the back of the palletized produce. This separates the low pressure plenum between at least the two rows of palletized produce from the high pressure, air plenum between the top and sides of the two rows of palletized produce and the ceiling of the chamber. This arrangement increases the pressure differential across the sides of the at least two tiers of the palletized produce to improve the forced air flow through the produce load perpendicular to the longitudinal axis of the low pressure plenum and thereby better directs and controls the pressurized air flow from the air handling unit to flow directly through openings formed in the sides of the boxes of the unitized, palletized produce and into the low pressure plenum.

As discussed above, the frame structure guides the palletized produce upon insertion into the chamber to position the pallets inwardly from the side walls of the chamber to facilitate air circulation through the palletized produce. The overall arrangement of the positioned and supported tiers of palletized produce, the seals, the interior wall structure and the walls, ceiling and floor of the chamber provides an advantageous forced air circulation directly through the openings formed in the sides of the boxes of the tiers of unitized and palletized produce to obtain a substantially uniform, controlled temperature, air circulation throughout the inserted produce load.

Significantly, the frame structure permits the stacking of a second tier and preferably a third and fourth tier of palletized produce within the ripening room to substantially increase the total amount of produce which may be processed for a given amount of floor space. Pursuant to an important feature of the invention, the frame structure includes side seals disposed between the tiers of the palletized produce and extending the full length of the produce load on each side thereof. The seal forming members block off and seal the side spaces between the top of the lower tier boxes and the pallets of the upper tier boxes of palletized produce. Accordingly, the side seal, together with the other seals, flexible ceiling, a rigid member and two front doors provide a maximum forced air circulation flow entirely through the boxes. This arrangement provides a most efficient and accurate control over the temperature of the entire produce load while minimizing the total energy required by the air handling unit to achieve the desired temperature condition. Moreover, the arrangement of the invention so as to accommodate a palletized produce load greatly facilitates handling of the produce by minimizing the number of handling steps required to load and unload the produce to and from the ripening chamber.

Finally, the arrangement of vertical air flow in the system allows the system to be easily expanded to accommodate a far larger number of pallets than before. This is because the user may simply add a larger duct unit, and more air intake units, to the existing system. As each intake unit is above its respective pallets, and would continue to be in an expanded system, there is no loss of air pressure. In the prior system, in contrast, the intake unit's placement at one end of the chamber would not allow such expansion.

For a better understanding of the above and other features of the invention, reference should be made to the following detailed description and to the accompanying drawings.

DETAILED DESCRIPTION

Figure 1:
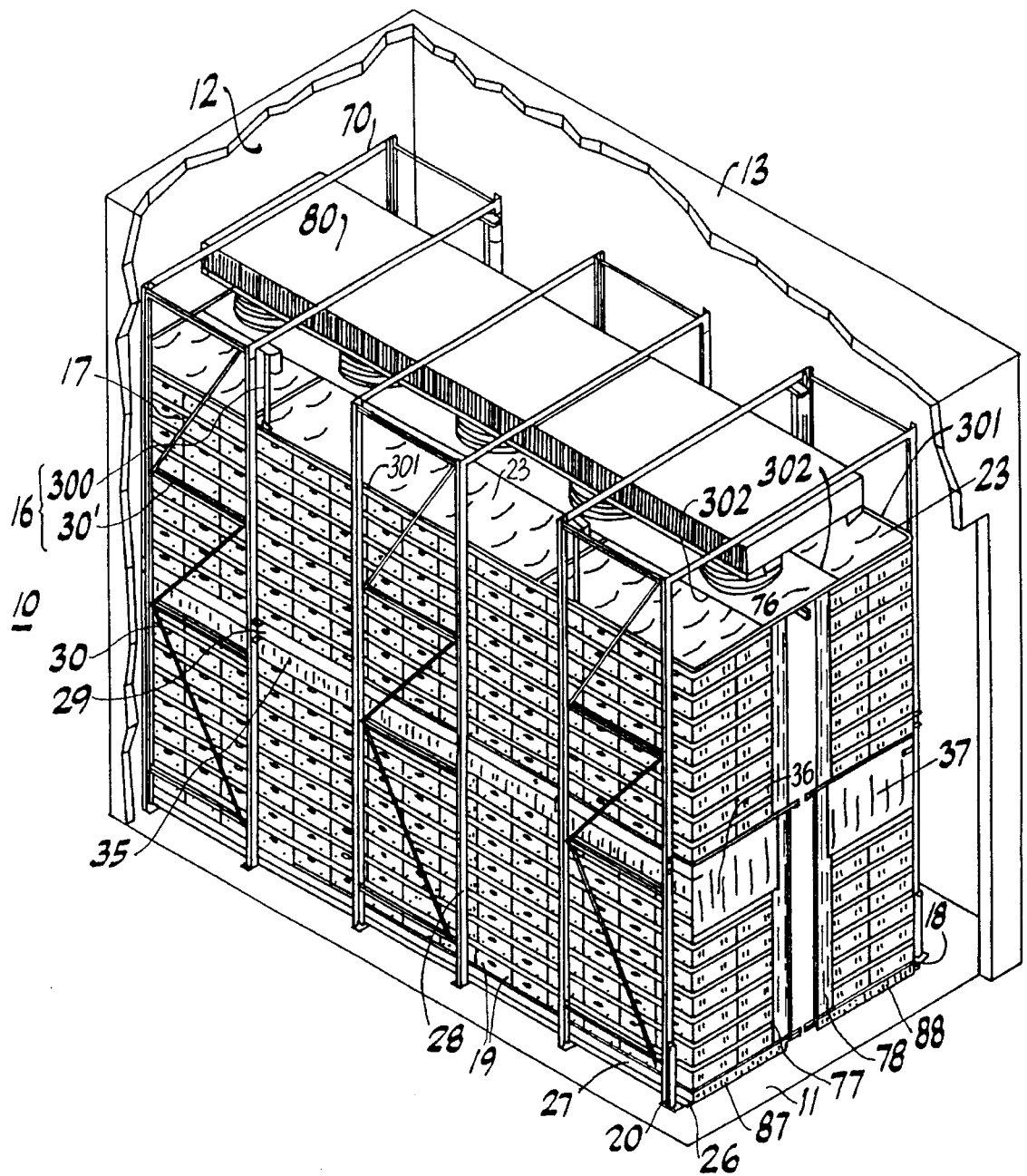
FIG. 1 is a perspective view of a ripening room in accordance with the invention with parts of the walls broken away to illustrate the arrangement of a unitized, palletized produce load arranged within the room.
Figure 2:
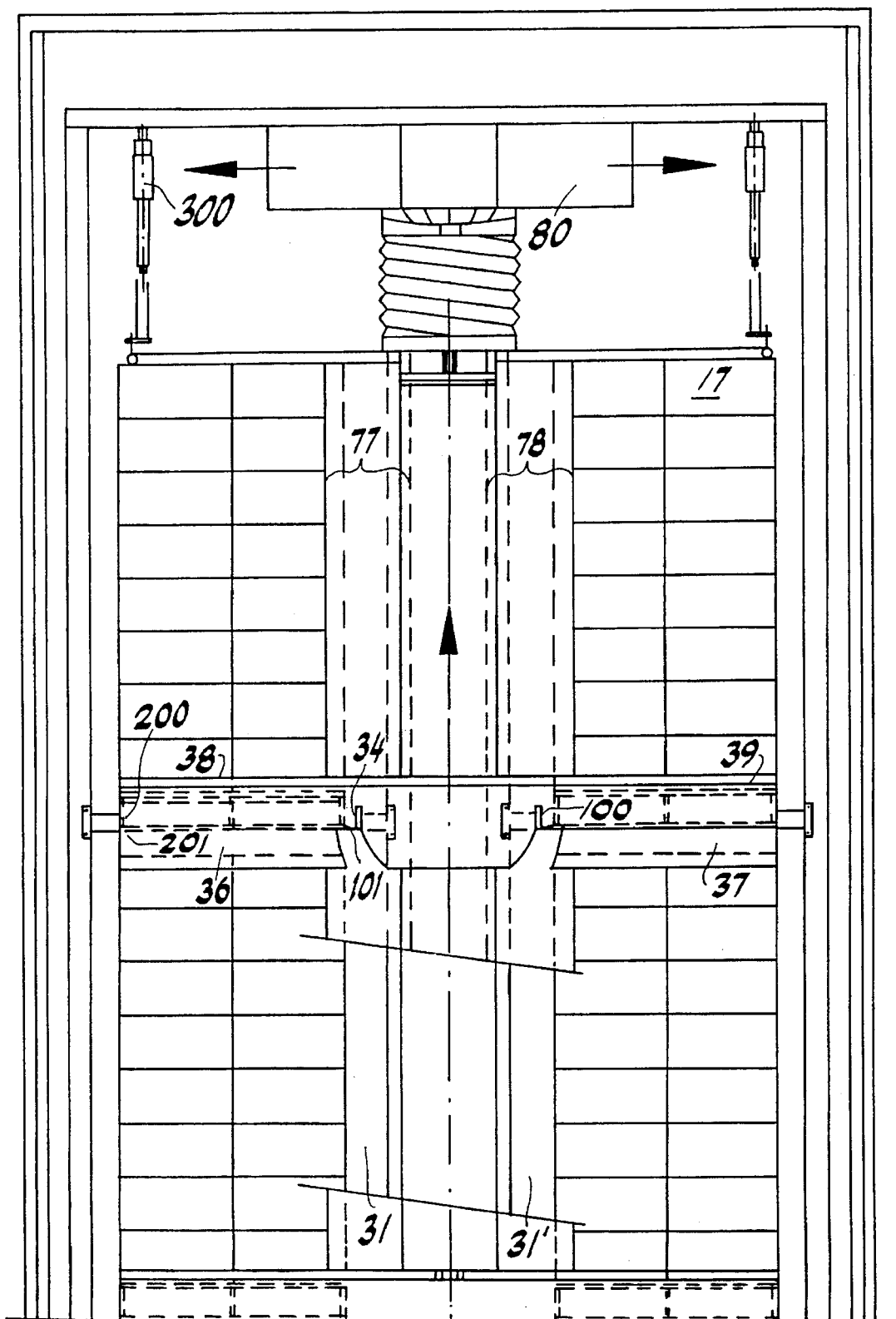
FIG. 2 illustrates a front view of an embodiment of a ripening room of the present invention.

Referring now to the drawings and initially to FIG 1, there is illustrated a ripening room according to an embodiment of the invention and is generally indicated by the reference numeral 10. While the following description describes a system with just two tiers, it should be recognized that such a system may be easily expanded to accomodate a third and even a fourth tier. This would be simply accomplished by repeating what is described as providing the structure for the second tier herein.

Figure 3:
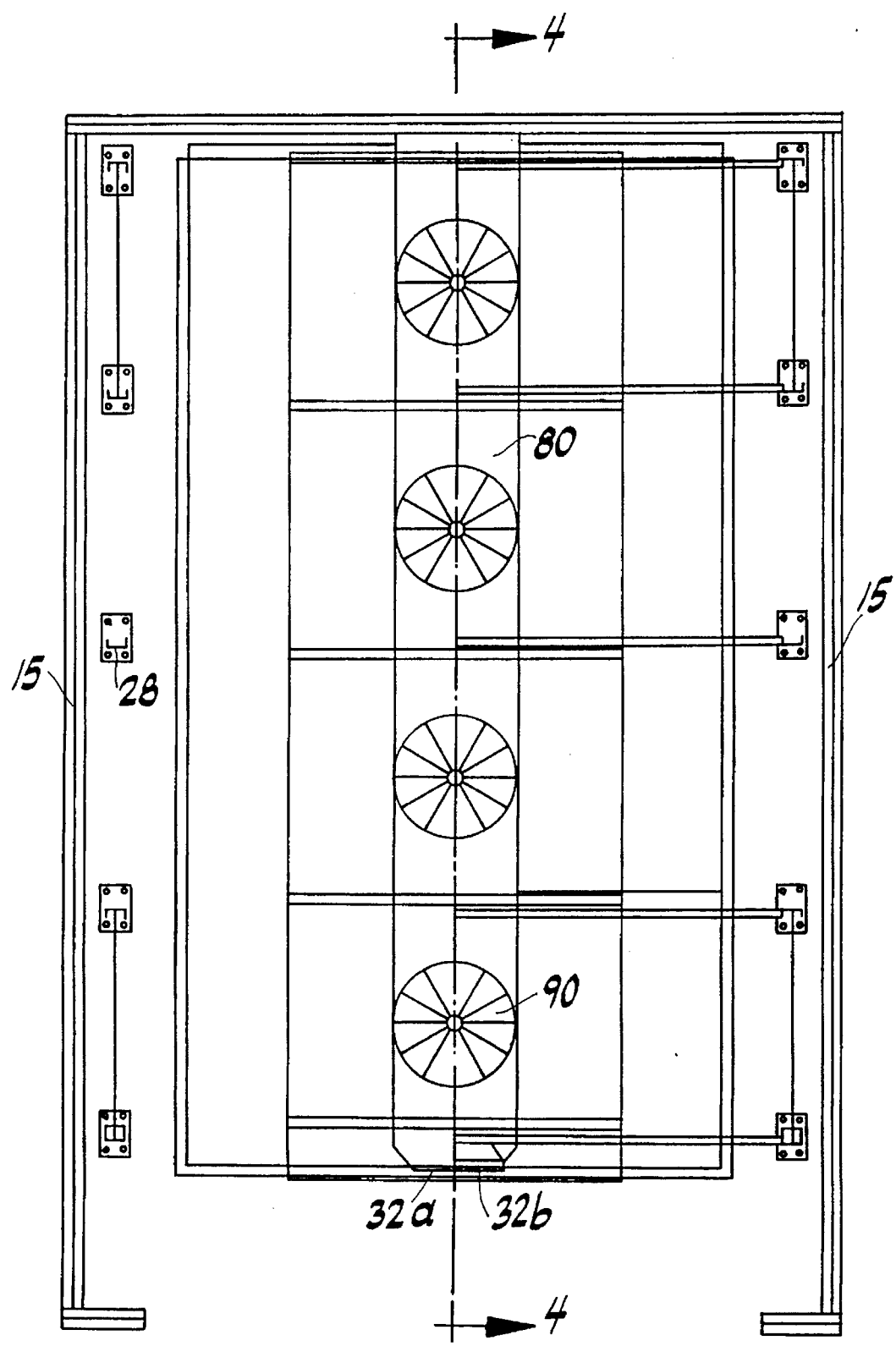
FIG. 3 illustrates a top view of an embodiment of a ripening room of the present invention, showing the vertical flow evaporator intake units.

The ripening room 10 includes a floor 11, rear wall 12, ceiling 13, a removable front panel 14 (shown in FIG. 4) and side walls 15 (see FIG. 3). The walls 12 and 15, front panel 14 and ceiling 13 are insulated and form a substantially gas tight chamber for the treatment of produce. The overall dimensions of the ripening room 10 are suitable to house at least two, two-tiered rows of palletized produce 16 and may be, e.g., approximately a height of 17', a width of 10' and a length of 25'. The removable front panel 14 is removed to insert or remove the produce load, as required.

Each unit of palletized produce 16 includes (used herein to denote the load of produce stacked onto one pallet) a plurality of protective boxes 17 to unitize and protect the produce. The protective boxes 17 are block-stacked on pallets 18 for easy handling during the insertion and removal of the produce load to and from the ripening room 10. Each pallet 18 may be, e.g., 40"×48" with 48 protective boxes 17 block-stacked thereon. Pursuant to the invention, each of the protective boxes 17 includes side openings 19 which register with similar openings in adjacent boxes to facilitate air flow through the boxes 17.

As illustrated in the figures, a metal frame structure 20 is provided to position the palletized produce within the ripening room 10 into two spaced rows, each having at least two vertical tiers of pallets 18, to provide a spacing between the rows of, e.g., 33". The frame structure 20 includes a pair of generally L-shaped members 26 extending longitudinally along a substantial longitudinal section of the floor 11 of the ripening room 10 and at each side thereof. A vertical leg 27 of each of the L-shaped members 26 is spaced inwardly from the adjacent side wall 15 a predetermined distance such as, e.g., 11", to define guide surfaces to engage and thereby space the pallets 18 from the walls 15. The vertical legs 27 are of sufficient height to seal off the lower pallets 18 from air flow therethrough their sides.

A plurality of vertical support columns 28 are spaced generally along the periphery of the ripening room 10. On these columns 28 are mounted support rails 29. Support rails 29 include vertical leg 200 and horizontal leg 201 (FIB 4). Horizontal leg 201 supports half of the outer periphery of the pallets 18 of each row of the upper tier of the palletized produce 16. Vertical leg 200 assists in guiding the upper tier pallets into their appropriate positions within the frame 20.

Figure 4:
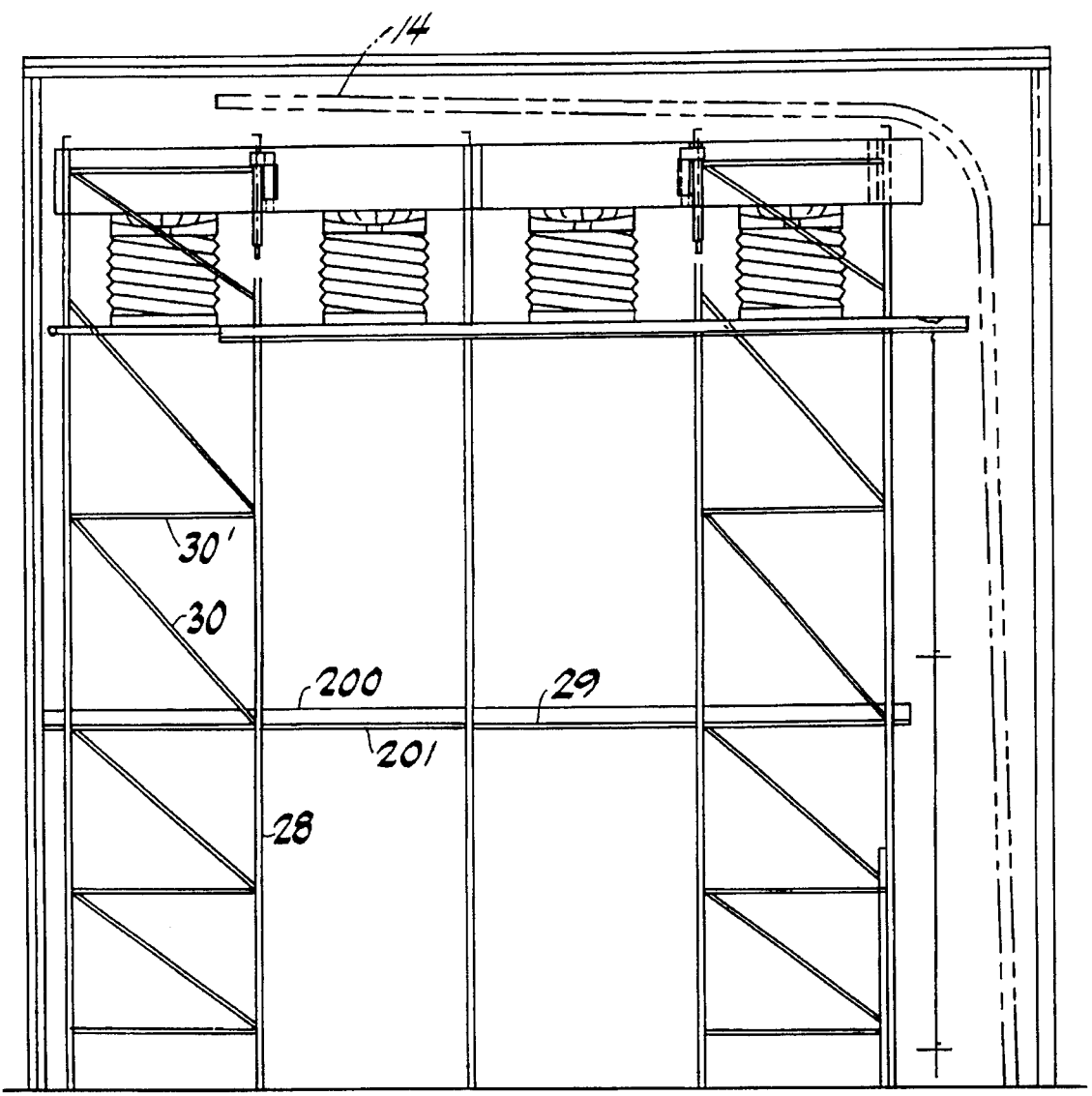
FIG. 4 illustrates a side view of an embodiment of a ripening room of the present invention, taken along line A—A of FIG. 3.

FIG. 4 also shows series of cross beams 30' which and horizontal beams 30' are secured to the vertical support columns 28 to provide structural integrity to the frame structure 20. Arranged midway between the vertical support columns 28, generally at the center line of the length of the ripening room 10 are two rows of vertical support columns (not shown) on which are L-shaped members 34. The L-shaped members 34 include vertical legs 100 which cooperate with the leg 200 to guide the upper tier pallets into the two spaced rows, as well as horizontal legs 101 which support the upper tier pallets once they are placed in the ripening room. The legs 201 and 101 are arranged to engage and support the periphery of the pallets 18 such that each of the second tier pallets are supported by the legs 201 and 101 directly above the lower tier pallets in two rows.

Each of the L-shaped members 27 and 34 includes vertical legs 200 and 100 of a sufficient height to seal off the upper pallets from air flow therethrough. Moreover, pursuant to a significant feature of the invention, a longitudinally extending flexible sealing strip 35 is formed as a downward extension of each rail 29.

In addition, one each of two vertical seals 77, 78 are connected to two vertical baffle doors 32a and 32b, provide sealing of the interstitial space at the front of the two tier arrangement. The width of this space may be, e.g., 33". The two vertical baffle doors 32a and 32b may be rotated 90° so as fit between the vertical support columns between the rows of palletized produce. In this way, they may be moved via a track to a plurality of locations within the chamber. This feature allows the accomodation of less than a room-full of palletized produce. In particular, if less than a full room is desired to be ripened, the vertical baffle doors may be moved on a track (not shown) to a point where they are substantially flush with the palletized produce that is desired to be ripened. At this point, they may be reopened to their full width, again sealing the interstitial space between the palletized produce. The width of the entire seal created by the vertical seals and the vertical doors may be, e.g., 37".

Center seals 36 and 37 are provided for sealing gaps due to the distance between the lower and upper palettes. These seals are connected to rotatable beams 38 and 39. In this way, the seals may be raised to allow the introduction of the produce. In an advantageous embodiment, overlapping seals 77, 78 are vinyl with thickness 0.08" as are center seals 36 and 37.

A final set of bottom seals 87 and 88 are provided to seal the front of the pallets 18 from air flow therethrough. These bottom seals may be, e.g., hung from beams similar to rotatable beams 38 and 39.

Referring again to FIG. 1, a two-part flexible ceiling 23 covers the top of the palletized produce 16. Together with the rear wall 12, the vertical sections of the rails 26 and 29, the flexible sealing strips 35, vertical seals 77 and 78, and center seals 36 and 37, the flexible ceiling 23 seals the outside of the palletized produce 16 such that, when the air handling unit is operating, a low pressure plenum is created in the interstitial space between the rows and a high pressure plenum is created outside of the frame structure. In this way, a pressure differential is maintained which forces air through the boxes.

In the illustrated embodiment of the invention, the flexible ceiling 23 is raised and lowered by linear actuators 300 which are connected to a plurality of horizontal beams 70. In particular, the linear actuators 300 are connected to a light ceiling frame. These horizontal beams 70 are connected to support columns 28. While one side of each of the two flexible ceilings 23 is connected to the linear actuators 300 via a first guide 301, the other side, nearest the center, is connected to a second guide 302. Together, the two parts of the flexible ceiling 23 seal the top of the produce. Sealing the interstitial space between the rows is a rigid member 76 which is connected to the side of the flexible ceiling opposite the linear actuators. Rigid member 76 contains holes for the evaporator intake units above the interstitial space. Flexible ceiling 23 is movable to assist in the unloading and loading of palletized produce 16 by virtue of linear actuators 300 being located at the corners of flexible ceiling 23 and attached to horizontal beams 70. When the linear actuators 300 raise the flexible ceiling 23 to allow the loading of the palletized produce, they also raise the rigid member 76 as well as the bottom of the evaporator's intake units. To assist in this, the intake units are connected to the holes in the rigid member via a flexible duct, allowing the duct to compress when the flexible ceiling is raised. In an advantageous embodiment of the invention, the flexible ceiling 23 may be made of polyolefin.

In a first embodiment, horizontal bars 70 also support duct 80 which is connected to evaporator intake units 90. Evaporator intake units 90 remove air from within the interstitial space and blow air in the direction of sidewalls 15. The pressure differential caused by the removal of air by evaporator intake units 90 and the recycling of air through duct 80 causes air to circulate into a fluid circulation space outside the frame 20 and through the openings 19 of the protective boxes 17, around the produce contained therein and into the sealed interstitial space between the two two-tiered rows of palletized products 16.

In a second embodiment an air conditioning unit (not shown) is attached to rear wall 12 for introducing air. Rear wall 12 may have an opening in this embodiment aligned with the duct 80 to introduce the controlled air. Air would thus be circulated by evaporator intake units 90 and the duct 80 through openings 19, around the produce contained in the protective boxes 17, and into the sealed interstitial space between the two tiered rows of palletized produce 16. The air would then be mixed with air from the conditioning unit so as to provide, e.g., fresh air or a predetermined type of air to the produce.

Due to the arrangement of flexible seals, the flexible ceiling, the side sealing effects of vertical legs of the rails, the center seals, the rigid member, the vertical interstitial seals, and the back seal (not shown), all of the forced air flows uniformly through the openings 19 of the protective boxes 17, and accordingly, around the produce contained therein. This ensures a maximum utilization of the pressure differential to uniformly circulate air throughout the produce load with an efficient operation of the evaporator intake units 90 and duct 80.

In this manner, evaporator intake units 90 are operable to remove the air within the interstitial volume between the rows of palletized produce 16 and thereby erect a closed loop system with a plenum between the rows of palletized produce which is at a lower pressure than the remaining space of the ripening room 10. This pressure differential effectively forces air through the palletized produce.

The present invention therefore provides a highly advantageous improvement in pressurized ripening systems. The frame structure permits at least two tiers of palletized produce to be arranged within the room to substantially increase the total amount of produce which may be processed for the given square footage of the facility within which the ripening room is arranged. The configuration of the frame structure, including the guide rails and provides an advantageous arrangement to properly position the produce load and to cause all air circulation to occur uniformly through the boxes without pressure leaks through the pallets or through the spacing between the two tiers. The resulting forced circulation through the boxes is therefore controllable. To uniformly and accurately control the temperature of the produce load to within a minimal temperature range, e.g., ±1° throughout the produce load, an air temperature control unit and an air flow control unit may be provided in the evaporator system. Furthermore, low pressures such as, e.g., 1/10" of water have been achieved with the present invention (cf. atmospheric pressure which is equal to 32 feet of water). Moreover, the teachings of the present invention may be economically implemented by converting existing one tier ripening rooms or open space two tier systems into the two-tier pressurized system of the invention. The present invention is ideally suited to the pressurized ripening of bananas.

It should be understood that the above has been a detailed description of the preferred embodiments. The full scope of the invention is covered only by the claims which follow and any equivalents thereof.

What is claimed is:

1. An apparatus for controlled, pressurized ripening of fresh produce, comprising:
   a. a chamber having a ceiling and front, rear and side walls;
   b. a frame structure arranged within said chamber to position and support at least two rows of palletized produce, each of said two rows including at least two vertically spaced tiers of palletized produce, said at least two rows being spaced apart by said frame structure to define an interstitial space therebetween, and said at least two rows being further spaced by said frame structure from the walls and ceiling of said chamber to define a fluid circulation space around said palletized produce;
   c. sealing means to seal said interstitial volume from said fluid circulation space;
   d. said frame structure including sealing members to seal said vertical space between said at least two-tiers from fluid circulation therethrough; and
   e. fluid control means located above said interstitial space to intake fluid from said interstitial space and to exhaust fluid into said fluid circulation space;
   f. whereby to create a pressure differential between said interstitial space and said fluid circulation space such that said fluid is forced to flow uniformly through said palletized produce.

2. The apparatus of claim 1 wherein said fluid control means comprises a plurality of evaporator intake units mounted with flexible ducts to introduce air into said fluid circulation space and to exhaust fluid from said interstitial space.

3. The apparatus of claim 1, wherein said palletized produce comprises a plurality of individual protective boxes of produce being block-stacked on pallets.

4. The apparatus of claim 3, wherein each of said protective boxes includes at least one side opening to permit air circulation therethrough.

5. The apparatus of claim 4 wherein the side openings of adjacent protective boxes of said block-stack are registered with one another.

6. The apparatus of claim 1 wherein said sealing members comprise longitudinally extending strips disposed between each of said vertically spaced tiers of palletized produce on either outer side thereof.

7. The apparatus of claim i wherein said sealing means comprises at least one vertical seal extending over one end of said interstitial space and a flexible ceiling conformed to the top of said palletized produce.

8. The apparatus of claim 1 wherein said frame structure comprises longitudinally extending guide rails to guide and position a first set of at least two lower rows of palletized produce and longitudinally extending support rails to guide and support a second set of at feast two upper rows of palletized produce vertically spaced above said first set of two lower rows.

9. The apparatus of claim 8 wherein said guide rails and support rails position said palletized produce into said first and second sets of rows to define an interstitial volume there between and a fluid circulation space around the outside of said palletized produce.

10. The apparatus of claim 2 wherein each one said plurality of evaporator intake units is placed over said interstitial space.

11. The apparatus of claim 2 wherein each one of said plurality of evaporator intake units is connected to a central duct via said flexible duct.

12. The apparatus of claim 2 wherein said plurality of evaporator intake units further comprises an air temperature control unit and an air flow control unit.

13. The apparatus of claim 7 further comprising a rigid member located on the top of the interstitial space, said rigid member having holes to allow fluid from the interstitial space to be exhausted by said plurality of evaporator intake units.

14. The apparatus of claim 7 wherein said flexible ceiling and said rigid member are movable by linear actuators connected to said frame structure.

15. The apparatus of claim 1 wherein said walls is insulated.

16. An apparatus for controlled, pressurized ripening of fresh produce, which comprises:
   a. a chamber having a ceiling and front, rear and side walls;
   b. support and positioning means to position and support at least two rows of at least two spaced tiers of palletized produce within said chamber, said palletized produce spaced from the ceiling and front, rear and side walls to define a fluid circulation space around said palletized produce;
   c. said support and positioning means further positioning said produce load into two spaced rows to define an interstitial volume therebetween;
   d. sealing means to seal said interstitial volume from said fluid circulation space and to seal the vertical spacing between said vertically spaced at least two tiers of palletized produce; and
   e. fluid control means to exhaust fluid from said interstitial volume from above said interstitial volume and to introduce fluid into said fluid circulation space to create a pressure differential between said interstitial space and said fluid circulation space to thereby force said fluid to flow uniformly through said palletized produce.

17. The apparatus of claim 16 wherein said support and positioning means comprises a frame structure.

18. The apparatus of claim 17 wherein said frame structure includes side sealing members to block fluid flow through the vertical spacing between said vertically spaced at least two tiers of palletized produce.

19. The apparatus of claim 16 wherein said palletized produce comprises individual protective boxes, each containing produce, said protective boxes being block-stacked on pallets.

20. The apparatus of claim 16 wherein said sealing means includes means for blocking fluid flow through said pallets.

* * * * *